Patented Jan. 26, 1943

2,309,151

UNITED STATES PATENT OFFICE 2,309,151

β-o-METHOXYPHENYLPROPYL METHYLAMINES

Eugene H. Woodruff, Kalamazoo, Mich., assignor to The Upjohn Company, Kalamazoo, Mich.

No Drawing. Application April 3, 1941, Serial No. 386,661

1 Claim. (Cl. 260—570.8)

This invention relates to improvements in β-o-methoxyphenylpropyl methylamines.

This invention is a continuation in part of my application Serial Number 341,468, filed June 20, 1940, for β-o-Methoxyphenylpropyl methylamine and the method of producing the same.

This invention relates to a new and useful product which is physiologically active for the treatment of asthma and the like. This product is particularly useful because it has a high, regular and persistent bronchodilator effect with such a low pressor effect that in therapeutic doses it is practically nil.

The objects of this invention are:

First, to produce a new and useful product.

Second, to produce such a product physiologically active as a therapeutic agent for treating asthma which has a very high bronchodilator effect and which has a practically negligible pressor effect.

Third, to provide such a substance of a low toxicity suitable for therapeutic use.

Fourth, to produce such a product which may be administered orally.

My new product may be termed β-o-methoxyphenylpropyl methylamine. Its structural formula is as follows:

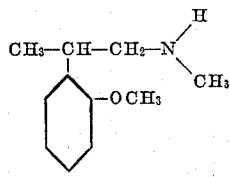

Method of preparation 33.0 grams (0.2 mole) of β-o-methoxyphenylpropyl amine were refluxed with 21.2 grams (0.2 mole) benzaldehyde and 50 cc. of absolute ethyl alcohol for 30 minutes. The alcohol and water were removed and the residue distilled in vacuo. B. P. 185–7° C. at 10 mm. Hg. The yield is theoretical.

50.8 grams (0.2 mole) β-o-methoxyphenyl benzalamine and 28.4 grams (0.2 mole) methyl iodide were heated in a sealed flask for 2½ hours at 100° on a steam bath. The flask was then opened and the viscous liquid was hydrolized by heating with 200 cc. methyl alcohol and 200 cc. water for fifteen minutes. The mixture was then steam distilled to remove the methyl alcohol and benzaldehyde. On cooling, the aqueous solution was acidified with 30 cc. of acetic acid and extracted twice with ether. The aqueous solution was then basified with 450 cc. of 33 per cent KOH solution, the product extracted with ether, the ether solution dried with anhydrous magnesium sulfate. After removal of the ether the residual oil was distilled. B. P. 128–135° C. at 15 mm. Hg.

The hydrochloride of the amine is best prepared as follows:

Dry HCl gas is passed into 25 cc. absolute alcohol until 4.1 grams has been absorbed. 17.9 (0.1 mole) of the amine in 50 cc. of absolute ether is added to the alcoholic hydrogen chloride. More absolute ether is added to bring the volume to about 300 cc. where the amine hydrochloride begins to precipitate. On cooling, about 18 grams of the hydrochloride may be filtered from the solution. M. P. 198.5–199° C.

The hydrochloride may be administered orally. The product is a very effective bronchodilator. With 0.5 cc. of 1/100 solution no pressor response is obtained. Its bronchodilator effect is 1/55 that of epinephrine and is superior to ephedrine. Its toxicity is low, which renders the compound suitable for therapeutic use, being 70 mg./kg. I. V. in white rats. That is, 70 milligrams per kilogram of rat when injected will kill 50 per cent of the animals to which it is administered. By the Sollman von Oettingen isolated lung test, an increased flow of 10 bubbles per minute may be regularly obtained by injection of ½ to 1 cc. doses of a 1/100 solution. Using the same procedure, ephedrine gives an irregular increase of 2 bubbles per minute.

In using the product for treating asthma or the like, the absence of increase in blood pressure is particularly valuable. Side reactions such as insomnia and heart disturbances are eliminated because the pressor effect is negligible in therapeutic doses. This product is particularly useful because the bronchodilator effect is of considerable duration, lasting much longer than that of epinephrine.

Salts of this amine may also be used. Salts of inorganic mineral acids and organic carboxylic acids may be used. Among the available salts are those formed from the following acids: Formic, acetic, propionic, butyric, valeric, hexoic, lauric, myristic, palmitic, stearic, oleic, oxalic, succinic, glutaric, adipic, maleic, fumaric, lactic, tartaric, hydrobromic, hydriodic, carbonic, boric, acids of phosphorus, sulfuric, sulfonic, alkylhydrogen sulfuric and nitric. Salts of such weak acids as carbonic may also be employed. In fact, any acid addition salt corresponding to an ammonium salt may be utilized as would be apparent to one skilled in the art as the product of this application may be considered as an ammonia.

Having thus described my invention, what I claim as new and desire to secure by Letters Patent is:

A physiologically active therapeutic agent capable of producing bronchodilator effects comprising essentially a β-o-methoxyphenylpropyl methylamine of the group consisting of β-o-methoxyphenylpropyl methylamine and the salts thereof.

EUGENE H. WOODRUFF.